(12) United States Patent
López-Pozas Lanuza

(10) Patent No.: US 10,684,104 B2
(45) Date of Patent: Jun. 16, 2020

(54) BIODEGRADABLE SHOTGUN CARTRIDGE

(71) Applicant: BIO AMMO, S.L., Santa Maria la Real de Nieva (Segovia) (ES)

(72) Inventor: Enrique López-Pozas Lanuza, Malaga (ES)

(73) Assignee: Bio Ammo, S.L., Santa Maria la Real de Nieva (ES)

( * ) Notice: Subject to any disclaimer, the term of this patent is extended or adjusted under 35 U.S.C. 154(b) by 0 days.

(21) Appl. No.: 15/570,275

(22) PCT Filed: Apr. 30, 2015

(86) PCT No.: PCT/ES2015/070356
§ 371 (c)(1),
(2) Date: Oct. 27, 2017

(87) PCT Pub. No.: WO2016/174276
PCT Pub. Date: Nov. 3, 2016

(65) Prior Publication Data
US 2018/0128583 A1 May 10, 2018

(51) Int. Cl.
*F42B 5/30* (2006.01)
*F42B 7/08* (2006.01)
*F42B 7/06* (2006.01)
*C08K 5/00* (2006.01)

(52) U.S. Cl.
CPC .............. *F42B 5/30* (2013.01); *C08K 5/0033* (2013.01); *F42B 7/06* (2013.01); *F42B 7/08* (2013.01)

(58) Field of Classification Search
None
See application file for complete search history.

(56) References Cited

U.S. PATENT DOCUMENTS

| 5,549,048 A | 8/1996 | Godfrey-Phillips et al. |
| 5,859,090 A | 1/1999 | Shahid et al. |
| 7,810,432 B2 * | 10/2010 | Stevens ............ F42B 7/08 102/453 |

FOREIGN PATENT DOCUMENTS

| EP | 0775724 A1 | 5/1997 |
| ES | 2100342 T3 | 6/1997 |
| GB | 2496180 A | 5/2013 |
| WO | 2015/033081 A1 | 3/2015 |

* cited by examiner

*Primary Examiner* — Reginald S Tillman, Jr.
(74) *Attorney, Agent, or Firm* — Knobbe, Martens, Olson & Bear, LLP

(57) ABSTRACT

The present invention relates to a biodegradable shotgun cartridge comprising a rim, a case and at least one base wad and at least one container wad, wherein said case, the at least one base wad and at least one container wad comprise (i) at least one biodegradable bioplastic of vegetable or fermentative origin; and (ii) an inert and non-toxic mineral filler, wherein said mineral filler comprises no more than 70% by weight with respect to the total weight of said material.

6 Claims, No Drawings

BIODEGRADABLE SHOTGUN CARTRIDGE

CROSS-REFERENCE TO RELATED APPLICATIONS

This application is the U.S. National Phase under 35. U.S.C. § 371 of International Application PCT/ES2015/070356, filed Apr. 30, 2015, the disclosure of which including the specification, the drawings, and the claims is hereby incorporated by reference in its entirety.

FIELD OF THE INVENTION

The present invention relates to a variety of fully biodegradable shotgun cartridges.

BACKGROUND OF THE INVENTION

A cartridge is made up of the rim, a case, at least one base wad, and at least one container wad for buckshot. The rim includes the detonating piston and is made of brass or steel, the case contains the gunpowder, the container wad and the buckshot or projectiles. The container wad is a plastic cup-shaped piece that separates the power charge and the buckshot. The base wad fixes the case to the rim through pressure so that they remain joined together both before and after the gunshot. Traditional cartridges comprised a case made of a paper tube provided with a paper base cover and a brass or steel rim together with the explosive powder, an inner wad made of fiber and lead buckshot. With the advent of plastics, the cases and the inner wads were replaced with synthetic plastics derived from petroleum, which were not biodegradable, such as high-density polyethylene.

The wad has a multiple mission: on the one hand, it takes full advantage of the gases produced in the combustion of the powder thanks to a perfect inner sealing of the cartridge at the time of firing, and on the other hand, it contains and protects the buckshot as it makes its way through the interior of the barrel preventing it from deforming due to friction with the walls. Furthermore, thanks to the bending of the joining column of the two cups of the wad, it softens the recoil of the weapon by buffering the initial impact that occurs when firing the weapon.

The use of cartridges made of non-biodegradable plastics presents important ecological problems, as the natural soil is littered with cases and wads or pieces of these without any treatment of the waste. It is in this action of dumping non-biodegradable plastics in nature, without recycling them in any way, wherein environmental contamination occurs, since both the cases and the wads will remain in the soil for centuries before degrading.

Environmental contamination occurs after firing the gunshot when the case is expelled from the weapon and remains on the ground, along with the container wad, since it is projected far way after the gunshot and is also scattered on the ground.

Currently, the most used plastic is high-density polyethylene, which may take ages to disappear from the environment. This is why currently hunting associations and shooting ranges demand a biodegradable cartridge, which also fulfills the proper functions for the development of these sports and activities. Said organic material must meet the technical specifications for use in cartridges, for example, they must have sufficient density and strength for their intended use while the materials that make up the mixture cannot contain any heavy metals or toxic elements.

The degradation of plastic products comprises a first stage involving the disintegration of the material into small particles, and this can be produced by the action of the sun, water, oxidation, microorganisms or heat. Only in the case of authentically compostable materials is a second stage produced within a few months (rather than decades or even centuries, as in the case of other materials) wherein the fragments of the material are converted into volatile materials due to the action of microorganisms, primarily in $CO_2$, water, biomass and energy for microorganisms in the case of aerobic decomposition and in $CH_4$, water, biomass and energy for microorganisms in the case of anaerobic decomposition. Therefore, degradable polymers (only a first degradation phase occurs) should not be confused with bioplastics, which also serve to increase microorganisms, i.e., from which microorganisms obtain energy.

A first response to the demand for biodegradable cartridges has been oxo-degradable plastics, which degrade with the presence of oxygen on a temporary scale that can be determined approximately by the chemical formulation that is added to conventional plastic during the extrusion stage. They are therefore plastics with a controlled lifespan. These plastics need a catalyst that breaks down the long carbon molecules into smaller units in order to facilitate their degradation, instead of relying on bacterial action like bioplastics. Oxo-degradation is a process designed for conventional plastics or non-biodegradable petroleum products. Although it is an improvement over high-density polyethylene, since it is a mixture of a biodegradable polymer and a conventional polymer plus a catalyst, it would only be partially and not totally biodegradable, so that the waste end products are not those established under the EN 13432 standard, and, in the long run, it would continue to deposit non-biodegradable plastics in the environment.

Another alternative to polyethylene and its derivatives has been PVA or Polyvinyl Alcohol, the family of degradable water-soluble plastics. It is soluble in water and absorbs it in large quantities, making it highly problematic in situations of high environmental humidity and it is not suitable for all products, especially for hunting cartridges, where the deformation of the PVA parts directly affects the quality of the cartridge making it very dangerous to use, since humidity is a fixed and inevitable environmental factor that has to be taken into account. Once the absorption of moisture begins, PVA loses it plastic characteristics. An additional problem of PVA is that its use in wetland areas, where it would dissolve in marshes, rivers and lakes would incorporate a synthetic element into the food chain. Furthermore, PVA is toxic in proportions higher than 5%.

Thus ES 2100342 T3 relates to a shotgun cartridge case manufactured by extrusion or equivalent pressure forming a high density polyolefin composition, said composition containing biodegradable starch and a stabilizing compound, the composition being stable in the case until the case is fired, at which time the stabilizing compound is partially destroyed or dispersed so that degradation occurs in the environment in which the case is left. This document relates to a composition containing 43.15% high-density polyethylene and 43% starch, and although the starch is biodegradable, the high-density polyethylene or polyolefin is not, and it also includes cupric stearate, ferric calcium oxide, benzophenone and soya bean oil in its composition. Therefore, it does not meet the biodegradability criteria, since high-density polyethylene, one of its main components, is non-biodegradable. On the other hand, it does not mention the base wad or the container wad that separate the powder from the buckshot and which generates as much or more contamination as the case.

GB 2496180 A describes mortar projectiles in which a vegetable filler is used instead of the usual mineral filler to make it brittle and thus is fragmented at the moment of impact. However, this type of fillers and compositions are not suitable for cartridges, since they are precisely intended to avoid fragmentation. Furthermore, this type of compositions would not withstand the pressures to which the cartridge is subjected, which are greater than those that the mortar projectile has to withstand.

WO 2015/033081 A1 discloses cartridges comprising a mixture of alkyl polysuccinate, polyhydroxyalkanoates (PHA) and vegetable fibers, wherein said PHA is present in proportions of not more than 20% by weight. The fibers make processing difficult and it would be desirable to find biodegradable compositions the mechanical properties of which are more favorable to processing such as, for example, by injection or molding. In addition, the polysuccinate is not biodegradable by itself within a reasonable amount of time, as in the composition described in GB 2496180 A and it requires the action of catalysts and/or the action of light or water to first promote its disintegration. As indicated in WO 2015/033081 A1, degradation is not observed in the absence of light or moisture.

Plastic and rubber cartridges derived from petroleum, such as the current ones, generate a great amount of contamination both in their processing and their degradation. In general, they present great drawbacks that our invention aims to resolve. This invention relates to a clean and odorless biodegradation produced by microorganisms, fungi and algae. None of the foregoing documents describes biodegradable cartridges.

SUMMARY OF THE INVENTION

The proposed invention fully solves this ecological problem created when, after firing a cartridge, an action that takes place in the countryside, in the middle of nature, the numerous pieces of cases and wads are scattered and buried into the ground. If we multiply this by the number of times gunshots are fired, it results in considerable damage to nature and wildlife.

The present invention is based on a biodegradable thermoplastic raw material consisting of polymers and elastomeric polymers of vegetable and fermentative origin as the main base, mixed with biodegradable thermoplastics that provide the necessary elasticity while avoiding breakage in their use, maintaining the biodegradability thereof after use, carbon dioxide, water, mineral salts and new microbial cellular constituents (biomass) being the end products of the aerobic biodegradation, while the material has the properties that are appropriate for withstanding the strong pressures that occur at the time of firing.

Therefore, the present invention relates to a biodegradable shotgun cartridge comprising a rim, a case and at least one base wad and at least one container wad, wherein said case, said at least one base wad and said at least one container wad are made of a material comprising (i) at least one bioplastic of vegetable or fermentative origin and (ii) an inert and non-toxic mineral filler, wherein said mineral filler comprises no more than 70% by weight with respect to the total weight of said material.

According to a preferred embodiment, all the polymers of the material are biodegradable, and at least 90% by weight with respect to the total weight of the material. The proposed invention totally resolves the aforementioned problems. After firing, the cartridges, including cases and wads, biodegrade in a matter of months without leaving any trace of contamination due to bacterial action, without the need for catalysts and without dissolving in water, resulting in carbon dioxide, water, mineral salts and new microbial cellular constituents (biomass).

DETAILED DESCRIPTION OF THE INVENTION

A bioplastic is a biodegradable plastic of natural origin produced by a living organism, synthesized from renewable energy sources and it does not need catalysts for the biodegradation thereof. In the present invention, "bioplastics" are understood as those polymers that comply with the EN 13432:2000 standard, i.e., those that biodegrade up to 90% by weight within six months in accordance with ISO standard 14855, i.e., those in which 90% of their mass by weight is transformed into carbon dioxide, water and biomass within 180 days. Preferably, at least 90% by weight disintegrates before 12 weeks to a size of less than 2 millimeters, in accordance with ISO standard 16929. The end products of the aerobic biodegradation of the test material are: carbon dioxide, water, mineral salts, and new microbial cellular constituents (biomass).

Furthermore, other biodegradability standards drafted by different standard bodies (ISO, CEN, ASTM, DIN, etc.). The criteria used for classification are varied: the environment in which the biodegradation occurs, the selected measurement variable, presence or absence of oxygen in the environment, etc. The international standards most commonly used in determining the biodegradability and/or compostability of plastic materials are the following:

UNE-EN-ISO 14852:2005: Determination of the ultimate aerobic biodegradability of plastic materials in an aqueous medium. Method by analysis of evolved carbon dioxide (ISO 14852:1999). Therefore, in one embodiment of the invention, said material is biodegradable in accordance with the UNE-EN-ISO 14852:2005 standard, according to the ISO 14852:1999 analysis method.

UNE-EN-ISO 14855:2005: Determination of the ultimate aerobic biodegradability and disintegration of plastic materials under controlled composting conditions. Method by analysis of evolved carbon dioxide (ISO 14855:1999). Therefore, in one embodiment of the invention, said material is biodegradable in accordance with the UNE-EN-ISO 14855:2005 standard, according to the ISO 14855:1999 analysis method.

UNE-EN-ISO 17556:2005: Determination of the ultimate aerobic degradability in soil by measuring the oxygen demand in a respirometer or the amount of carbon dioxide evolved (ISO 17556:2003). Therefore, in one embodiment of the invention, said material is biodegradable in accordance with the UNE-EN-ISO 17556:2005 standard, according to the ISO 17556:2003 analysis method.

These test standards are based on the fact that during the biodegradation of the test material in the presence of oxygen, carbon dioxide, water, mineral salts and new biomass products are generated. The percentage of biodegradation is calculated by means of the ratio between the carbon dioxide generated from the test material and the theoretical maximum amount of carbon dioxide that can be produced from the test material.

The requirements that a plastic product has to meet in order to be compostable are set forth by the European EN 13432 standard, and are as follows:

Material analysis: consists in analyzing the material to check its content in heavy metals, total organic carbon, total nitrogen, etc.

Biodegradability: the standard states that at least 90% of the packaging must biodegrade within six months. To check biodegradability, it recommends that ISO standard 14855 should preferably be followed.

Disintegration: checking whether the material is capable of physical degradation into fragments smaller than 2 mm. ISO standard 16929

Compost quality: this is carried out by comparing compost in which plastic samples have been added and a blank (composite without samples). Different parameters (metals, calcium, phosphorus, potassium, etc.) are analyzed to make sure that the compost is suitable for agriculture. Ecotoxicity tests are also carried out on plants, analyzing their growth in substrate to which compost with plastic waste has been added and in a substrate without this waste. OCDE 208 test.

In one embodiment of the invention, the material complies with the OCDE 208 test. In another embodiment of the invention, the material is compostable in accordance with the EN 13432 standard.

The advantages offered by the present invention are based on a biodegradable material made up of biodegradable bioplastics such as polylactic acid, PLA. In addition to the biodegradable bioplastics of vegetable or fermentative origin, the material of the present invention may comprise elastomeric polymers of vegetable origin or mixtures of the same conventional biodegradable polymers such as polycaprolactone. According to another embodiment of the invention, the material of the invention comprises at least one biodegradable thermoplastic bioplastic.

The cartridge of the invention is made up of biodegradable material from renewable energy sources that minimize environmental contamination both in obtaining the raw material, the manufacture thereof and subsequent elimination from the environment. It is a clean and odorless biodegradation produced by microorganisms, fungi and algae. The biodegradable cartridges of this invention do not attract insects and small rodents for the consumption thereof. As a result, this invention provides shotgun cartridges for hunting and sport shooting with the same physical and mechanical characteristics as conventional petrochemical plastics while adding the biodegradable condition thereof.

Bioplastics have the same physical-chemical and thermoplastic properties as polymers made from petroleum, but once disposed of under favorable conditions, they are biodegradable.

According to a preferred embodiment, biodegradable bioplastic is a mixture of a first biodegradable bioplastic with an elastomeric bioplastic. Elastomeric bioplastics are characterized by their great elasticity and ability to stretch and rebound, recovering their original shape once the force that deformed them is removed. They comprise the natural rubbers obtained from natural latex and synthetics. Including elastomeric bioplastics enables obtaining cartridges with the appropriate mechanical properties. In general, it is advisable that the higher the gunpowder charge, the higher the charge of elastomeric bioplastic. In a non-limiting manner, different cases and wads of the biodegradable shotgun cartridges can be carried out, since each cartridge and each wad require different physical-mechanical characteristics, and there are a large variety of cartridges, according to the intended use. Therefore, they may be manufactured using a mixture of bioplastics of vegetable origin such as PLA, plus biodegradable elastomeric polymers, for example, those that comprise at least 90% rubber or latex, of vegetable origin or derived from petroleum, such as, for example, those that comprise at least 90% polycaprolactones, butylene polysuccinate, polyvinyl alcohol, poly (butyl succinate-coadipate). Said biodegradable elastomer, preferably of vegetable origin, is preferably found in proportions of between 10% and 90% by weight with respect to the total weight of the material. According to another particular embodiment, said elastomeric bioplastic is found in proportions of between 20% and 80% by weight with respect to the total weight of the material.

According to an alternative embodiment, the material may also contain small amounts (not more than 10% by weight with respect to the total weight of the material) of thermoplastic polymers accompanied by a catalyst that induces degradation.

In another different embodiment a bioplastic made up of biodegradable elastomeric polymers of vegetable origin is used, which are preferably found in proportions of between 10% and 90% by weight with respect to the total weight of the material. According to another particular embodiment, said biodegradable elastomeric polymers of vegetable origin are found in proportions of between 20% and 80% by weight with respect to the total weight of the material.

The preferred materials for the manufacture of these shotgun cartridges are biodegradable thermoplastics of vegetable origin to which biodegradable thermoplastic polymers derived from petroleum can be added.

According to one embodiment, the biodegradable elastomeric thermoplastics from renewable energy sources are bioplastics formed by elastomeric polymers of vegetable origin such as rubber with not more than 90% by weight with respect to the total weight of the material.

Biodegradable elastomeric thermoplastics derived from petroleum are found in maximum proportions of 60% by weight with respect to the total weight of the material.

The typical proportion of the material is of between 10% and 90% of elastomeric bioplastic with respect to the total weight of the material, for example, between 20% and 85% elastomeric bioplastic with respect to the total weight of the material, preferably between 40% and 80%, more preferably between 50% and 75% by weight with respect to the total weight of the material.

Biodegradable thermoplastics from renewable sources are those made up of bioplastics formed by polymers of vegetable origin with not more than 99% of the mixture, plus a load of inert and non-toxic minerals from the group of carbonates and mineral salts, such as calcium carbonate, sodium bicarbonate or barium sulfate. This group includes bioplastics based on PLA (polylactic acid) copolymer polyesters of the polyhydroxybutyrate (PHB)/polyhydroxyvalerate (PHV) type, and pullulan (a polysaccharide polymer), among others.

According to an embodiment of the invention, a biodegradable and bio-compostable bioplastic represents at least 30% by weight with respect to the total weight of the material, preferably more than 40%, preferably more than 50%, more preferably between 60% and 100%, or between 80% and 100% by weight with respect to the total weight of the material.

In fact, each of the elements of the cartridge (the case, the container wad, the base wad or even the rim) can be made of different bioplastics or different mixtures of bioplastics depending on the mechanical needs of each of them.

The biodegradation property of the variety of shotgun cartridges of this invention, with the different types of biodegradable materials mentioned above, depends mainly on the action of microorganisms and fungi. These microorganisms produce enzymes that catalyze the breakdown of the complex materials used as substrates (polymers) into units that are more susceptible to being assimilated by the microorganisms for the production of biomass.

All these processes are regulated and standardized by European standard EN 13432:2000 "Packaging. Requirements for packaging recoverable through composting and biodegradation." Under normal composting conditions, 90% of the mass is biodegraded into carbon dioxide, water, mineral salts and new microbial cellular constituents (biomass), thus achieving biodegradability and complying with current regulations.

In addition to biodegradation, it is important to mention biodisintegration. This occurs in composite materials consisting of a biodegradable component and a non-biodegradable component, wherein at least 90% by weight with respect to the total weight of the material is biodegradable, such as, for example, a mixture of PLA or bioplastics based on starch and PP (polypropylene), a conventional plastic like PVC, in a biodegradable ratio of at least 90% of the mixture. The rest of the material may be the mineral or a conventional thermoplastic and a catalyst to enhance biodegradation thereof. According to one embodiment, the material comprises between 1% and 10% by weight with respect to the total weight of said material of a thermoplastic polymer and between 0.5% and 3% of an oxidizing catalyst.

The cartridges of the invention must have a suitable specific weight such as, for example, in the range of 0.6 gr/cm$^3$ to 5 gr/cm$^3$. According to a particular embodiment, the range is located between 0.6 gr/cm$^3$ and 2.0 gr/cm$^3$, more specifically between 0.7 gr/cm$^3$ and 1.8 gr/cm$^3$, more specifically between 0.8 gr/cm$^3$ and 1.7 gr/cm$^3$.

Biodegradable polymers of vegetable origin, including elastomers, form the main base of the mixture, representing no less than 5% and no more than 100% thereof, it being possible to mix them in multiple proportions within this range in order to achieve the physical-mechanical characteristics suitable for the specific use of each cartridge.

Biodegradable polymers of vegetable origin or derived from petroleum, or thermoplastics with catalysts and mineral filler, form the rest of the mixture, it being possible to mix them in multiple proportions in order to achieve the physical-mechanical characteristics suitable for the specific use of each cartridge.

The biodegradable shotgun cartridges of the present invention are made up of a biodegradable polymer case manufactured by an extrusion or injection and molding process, and a base wad and a container wad made up of biodegradable polymers manufactured by an injection and molding process. According to a preferred embodiment, the rim is made up of biodegradable polymers manufactured by an injection and molding process, preferably with a material according to the present invention. Thus, according to one embodiment, said rim is made of metal or of a material comprising (i) at least one biodegradable bioplastic of vegetable or fermentative origin and, (ii) an inert and non-toxic mineral filler, wherein said mineral filler comprises not more than 70% by weight with respect to the total weight of said material.

The present invention is explained by the following example or preferred embodiment, which should not be construed as limiting the scope thereof. Thus, the biodegradable shotgun cartridges proposed in this invention, in addition to a metal rim (for example, brass or steel), consist of a case, a base wad and a container wad and are made of a material comprising the following proportions in relation to weight:

A bioplastic comprised of biodegradable polymers of vegetable origin, such as 60% of PLA, plus 39% of a biodegradable elastomeric polymer and 1% of a calcium carbonate mineral filler, will be used for the base wad and the container wad, manufactured by injection.

A bioplastic comprised of biodegradable elastomeric polymers of vegetable origin, plus a maximum of 5% mineral filler, such as calcium carbonate, sodium bicarbonate or barium sulfate, is used for the case.

What is claimed is:

1. A biodegradable shotgun cartridge comprising a rim, a case and at least one base wad and at least one container wad,
   wherein said case, said at least one base wad and said at least one container wad are each made only from biodegradable bioplastic, and
   wherein said biodegradable bioplastic consists of polylactic acid (PLA) and a biodegradable polymer with elastomeric properties.

2. The biodegradable shotgun cartridge according to claim 1, wherein said biodegradable polymer with elastomeric properties is selected from the group consisting of rubber and latex.

3. The biodegradable shotgun cartridge according to claim 1, wherein said PLA is extracted from cornstarch, potato starch or cellulose.

4. The biodegradable shotgun cartridge according to claim 1, wherein the specific weight of said biodegradable bioplastic is comprised between 0.6 gr/cm$^3$ and 5 gr/cm$^3$.

5. The biodegradable shotgun cartridge according to claim 1 further comprising between 1% and 10% by weight with respect to the total weight of said biodegradable bioplastic of a thermoplastic polymer and between 0.5% and 3% of an oxidizing catalyst.

6. The biodegradable shotgun cartridge according to claim 1, wherein said rim is made from the biodegradable bioplastic.

* * * * *